United States Patent
Clever et al.

(10) Patent No.: US 7,849,829 B2
(45) Date of Patent: Dec. 14, 2010

(54) CONCENTRIC CAMSHAFT WITH INDEPENDENT BEARING SURFACE FOR FLOATING LOBES

(75) Inventors: Glenn E. Clever, Washington, MI (US); Rodney K. Elnick, Washington, MI (US); Roy Glenn Kaywood, Jackson, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 328 days.

(21) Appl. No.: 12/046,943

(22) Filed: Mar. 12, 2008

(65) Prior Publication Data

US 2009/0229551 A1 Sep. 17, 2009

(51) Int. Cl.
 *F01L 1/04* (2006.01)
(52) U.S. Cl. .................. 123/90.6; 123/90.17; 29/888.1; 74/567; 74/568 R
(58) Field of Classification Search ................ 123/90.6, 123/90.17; 29/888.1; 74/567, 568 R
 See application file for complete search history.

(56) References Cited

U.S. PATENT DOCUMENTS

| | | | |
|---|---|---|---|
| 4,597,365 A | | 7/1986 | Madaffer |
| 4,993,282 A | * | 2/1991 | Swars ........................... 74/567 |
| 5,165,303 A | * | 11/1992 | Riemscheid et al. .......... 74/567 |
| 5,218,883 A | * | 6/1993 | Swars ........................... 74/567 |
| 5,359,970 A | * | 11/1994 | Krebs ....................... 123/90.17 |
| 5,577,420 A | * | 11/1996 | Riemscheid et al. .......... 74/567 |
| 5,664,463 A | * | 9/1997 | Amborn et al. ................ 74/567 |
| 5,979,386 A | * | 11/1999 | Swars ......................... 123/90.6 |
| 6,182,362 B1 | | 2/2001 | Lancefield |
| 6,192,582 B1 | * | 2/2001 | Swars ......................... 29/888.1 |
| 6,247,436 B1 | | 6/2001 | Lancefield et al. |
| 6,253,719 B1 | | 7/2001 | Methley |
| 6,725,817 B2 | | 4/2004 | Methley et al. |
| 6,725,818 B2 | | 4/2004 | Methley |
| 7,210,440 B2 | * | 5/2007 | Lawrence et al. ........... 123/90.6 |
| 7,444,968 B2 | * | 11/2008 | Lancefield et al. ....... 123/90.17 |
| 2005/0226736 A1 | | 10/2005 | Lancefield et al. |
| 2006/0185471 A1 | | 8/2006 | Lawrence et al. |
| 2006/0207538 A1 | | 9/2006 | Lancefield et al. |
| 2007/0119402 A1 | | 5/2007 | Lancefield et al. |

FOREIGN PATENT DOCUMENTS

| | | | |
|---|---|---|---|
| DE | 4306621 A1 | * | 9/1994 |
| EP | 1473443 | | 3/2004 |
| JP | 03111607 A | * | 5/1991 |
| WO | WO2006/067519 | | 6/2006 |
| WO | WO2006/097767 | | 9/2006 |
| WO | WO2007/052075 | | 5/2007 |

\* cited by examiner

*Primary Examiner*—Thomas E Denion
*Assistant Examiner*—Daniel A Bernstein
(74) *Attorney, Agent, or Firm*—Harness, Dickey & Pierce, P.L.C.

(57) ABSTRACT

A camshaft may include a first shaft, a first lobe member fixed to the first shaft, a second lobe member fixed to the first shaft, and a third lobe member. The first lobe member may include a first lobe portion and a first bearing portion extending axially from the first lobe portion. The second lobe member may include a second lobe portion and a second bearing portion extending axially from the second lobe portion toward the first bearing portion. The third lobe member may include a first end that is rotatably supported on the first bearing portion and a second end that is rotatably supported on the second bearing portion.

20 Claims, 4 Drawing Sheets

CONCENTRIC CAMSHAFT WITH INDEPENDENT BEARING SURFACE FOR FLOATING LOBES

FIELD

The present disclosure relates to engine camshaft assemblies, and more specifically to concentric camshaft assemblies.

BACKGROUND

The statements in this section merely provide background information related to the present disclosure and may not constitute prior art.

Engines typically include a camshaft to actuate intake and exhaust valves. Some camshafts are concentric camshafts that provide for relative rotation between the intake and exhaust lobes. The intake lobes may be fixed to an outer shaft for rotation with the shaft and the exhaust lobes may be rotatably supported on the shaft. Alternatively, the exhaust lobes may be fixed to the outer shaft for rotation with the shaft and the intake lobes may be rotatably supported on the shaft. In either arrangement, the lobes that are rotatably supported on the shaft may use an outer surface of the outer shaft as a bearing surface. The use of the outer surface of the shaft as a bearing surface may require tighter tolerances for the outer diameter of the outer shaft, and therefore additional machining operations resulting in additional cost.

SUMMARY

A camshaft may include a first shaft, a first lobe member fixed to the first shaft, a second lobe member fixed to the first shaft, and a third lobe member. The first lobe member may include a first lobe portion and a first bearing portion extending axially from the first lobe portion. The second lobe member may include a second lobe portion and a second bearing portion extending axially from the second lobe portion toward the first bearing portion. The third lobe member may include a first end that is rotatably supported on the first bearing portion and a second end that is rotatably supported on the second bearing portion.

An engine assembly may include an engine structure, a camshaft supported on the engine structure, and a cam phaser coupled to the camshaft. The camshaft may include a first shaft, a first lobe member fixed to the first shaft, a second lobe member fixed to the first shaft, and a third lobe member. The first lobe member may include a first lobe portion and a first bearing portion extending axially from the first lobe portion. The second lobe member may include a second lobe portion and a second bearing portion extending axially from the second lobe portion toward the first bearing portion. The third lobe member may include a first end that is rotatably supported on the first bearing portion and a second end that is rotatably supported on the second bearing portion. The cam phaser may selectively rotate the third lobe member on the first and second bearing portions.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
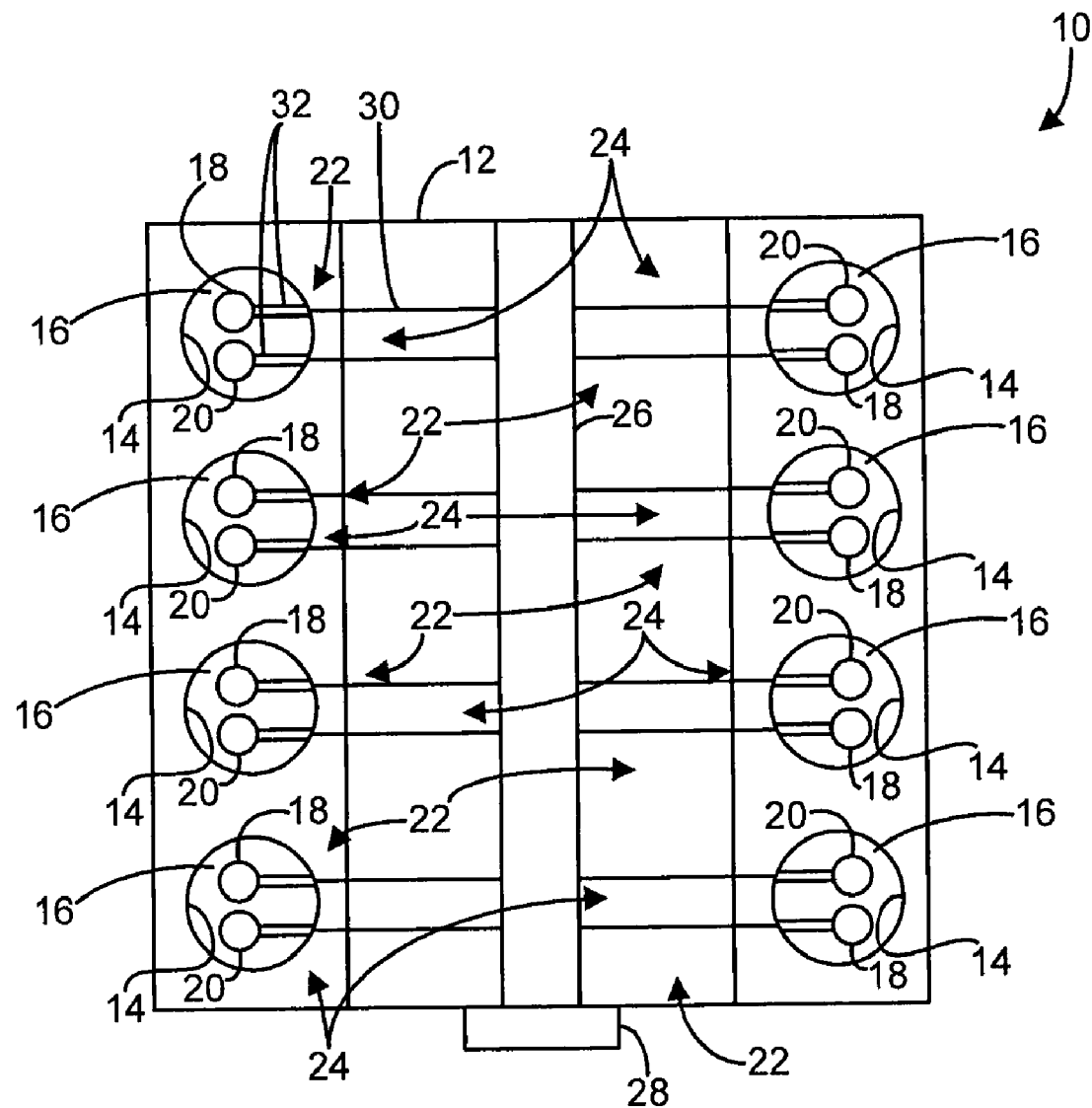
FIG. 1 is a schematic illustration of an engine assembly according to the present disclosure.

The following description is merely exemplary in nature and is not intended to limit the present disclosure, application, or uses. It should be understood that throughout the drawings, corresponding reference numerals indicate like or corresponding parts and features.

Referring now to FIG. 1, an exemplary engine assembly 10 is schematically illustrated. The engine assembly 10 may include an engine 12 defining a plurality of cylinders 14 having pistons 16 disposed therein. The engine 12 may further include an intake valve 18, an exhaust valve 20, and intake and exhaust valve lift mechanisms 22, 24 for each cylinder 14, as well as a camshaft 26 and a cam phaser 28.

The intake valve lift mechanism 22 may include a pushrod 30 and a rocker arm 32. The exhaust valve lift mechanism 24 may additionally include a pushrod 30 and a rocker arm 32. The camshaft 26 may be supported by an engine structure such as an engine block. Pushrods 30 may be engaged with the camshaft 26 to actuate the rocker arms 32 and may selectively open the intake and exhaust valves 18, 20. While the engine assembly 10 is illustrated as a pushrod engine, it is understood that the present disclosure may be applicable to a variety of other engine configurations as well, such as overhead cam engines, where the camshaft 26 is supported by a cylinder head.

Figure 2:
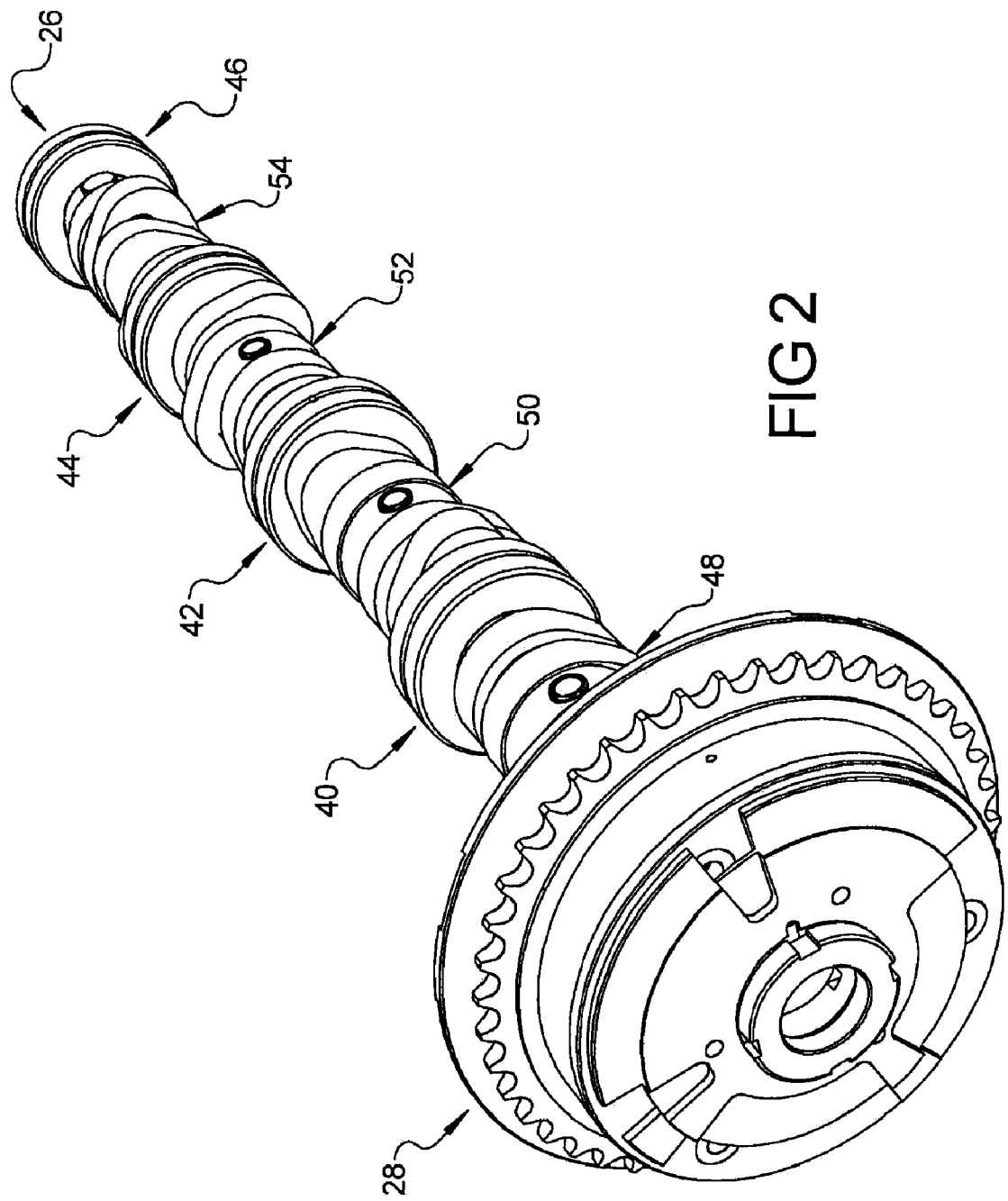
FIG. 2 is a perspective view of the camshaft and cam phaser of FIG. 1.
Figure 3:
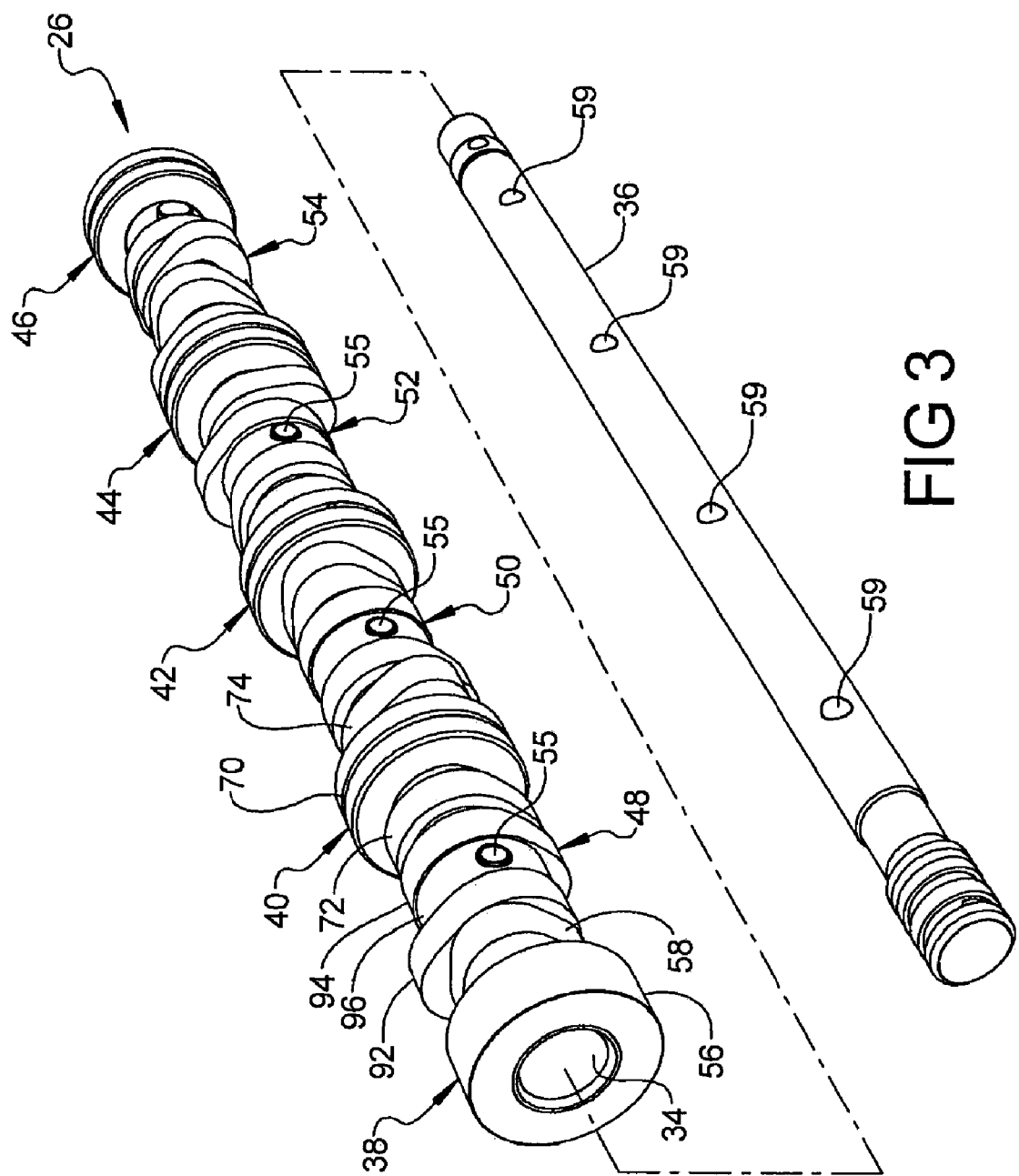
FIG. 3 is a perspective exploded view of the camshaft of FIG. 1.
Figure 4:
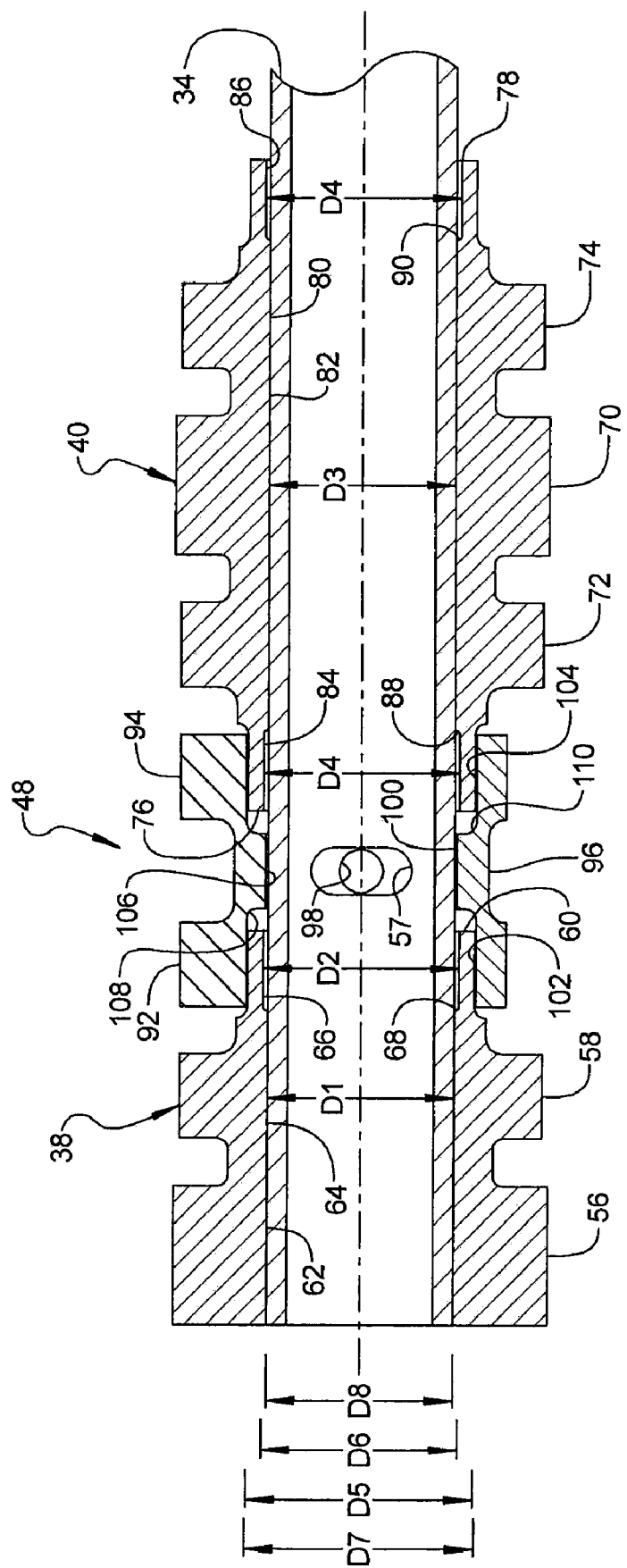
FIG. 4 is a fragmentary section view of the camshaft of FIG. 1.

With reference to FIGS. 2-4, the camshaft 26 may include first and second shafts 34, 36, a first set of lobe members 38, 40, 42, 44, 46, a second set of lobe members 48, 50, 52, 54, and drive pins 55. In the present example, the first set of lobe members 38, 40, 42, 44, 46 may form an intake lobe set and the second set of lobe members 48, 50, 52, 54 may form an exhaust lobe set. However, it is understood that alternate arrangements may be provided where the first set of lobe members 38, 40, 42, 44, 46 may form an exhaust lobe set and the second set of lobe members 48, 50, 52, 54 may form an intake lobe set.

The second shaft 36 may be rotatably disposed within the first shaft 34. The first shaft 34 may include slots 57 therethrough and the second shaft 36 may include apertures 59 that receive the pins 55 therein and couple the second set of lobe members 48, 50, 52, 54 for rotation with the second shaft 36. The slots 57 in the first shaft 34 may generally allow for a rotational travel of the pins 55 therein.

The first set of lobe members 38, 40, 42, 44, 46 may be fixed for rotation with the first shaft 34. The engagement between the first set of lobe members 38, 40, 42, 44, 46 and the first shaft 34 may include a friction fit engagement. The second set of lobe members 48, 50, 52, 54 may be disposed between adjacent ones of the first set of lobe members 38, 40, 42, 44, 46.

The lobe members 38, 46 may be generally similar to one another. Therefore, the lobe member 38 will be described with the understanding that the description applies equally to the lobe member 46. The lobe member 38 may include a journal portion 56, a lobe portion 58, and a bearing portion 60.

As seen in FIG. 4, the lobe member 38 may include a bore 62 defining a first radial inner surface 64 at the journal and lobe portions 56, 58 and a second radial inner surface 66 at the bearing portion 60. The second radial inner surface 66 may be offset radially outwardly relative to the first radial inner surface 64, forming a stepped region 68 therebetween. More specifically, the first radial inner surface 64 may define a first diameter (D1) that is less than a second diameter (D2) defined by the second radial inner surface 66.

The lobe members 40, 42, 44 may be generally similar to one another. Therefore, the lobe member 40 will be described with the understanding that the description applies equally to the lobe members 42, 44. The lobe member 40 may include a journal portion 70, first and second lobe portions 72, 74, and first and second bearing portions 76, 78. The first bearing portion 76 may extend axially from the first lobe portion 72 and toward the bearing portion 60 of the lobe member 38.

The lobe member 40 may include a bore 80 defining a first radial inner surface 82 at the journal and lobe portions 70, 72, 74, a second radial inner surface 84 at the first bearing portion 76, and a third radial inner surface 86 at the second bearing portion 78. The second and third radial inner surfaces 84, 86 may be offset radially outwardly relative to the first radial inner surface 82, forming stepped regions 88, 90 therebetween. More specifically, the first radial inner surface 82 may define a third diameter (D3) that is less than a fourth diameter (D4) defined by the second and third radial inner surfaces 84, 86.

The lobe members 48, 50, 52, 54 may be generally similar to one another. Therefore, the lobe member 48 will be described with the understanding that the description applies equally to the lobe members 50, 52, 54. The lobe member 48 may include first and second lobe portions 92, 94 and a connecting portion 96 extending axially between the first and second lobe portions 92, 94 and fixing the first and second lobe portions 92, 94 to one another. The connecting portion 96 may generally form a fixation region for the lobe member 48 and may include an aperture 98 that receives the pin 55 to couple the lobe member 48 to the second shaft 36.

The lobe member 48 may include a bore 100 defining first and second radial inner surfaces 102, 104 at the first and second lobe portions 92, 94 and a third radial inner surface 106 at the connecting portion 96. The first and second radial inner surfaces 102, 104 may be offset radially outwardly relative to the third radial inner surface 106, forming stepped regions 108, 110 therebetween. More specifically, the first and second radial inner surfaces 102, 104 may define a fifth diameter (D5) that is greater than a sixth diameter (D6) defined by the third radial inner surface 106.

As seen in FIG. 4, the first and second radial inner surfaces 102, 104 of lobe member 48 may be rotationally supported on the bearing portions 60, 76. The sixth diameter (D6) may be less than the outer diameter (D7) of the bearing portions 60, 76.

As discussed above, the first shaft 34 may be located within the bores 62, 80, 100 of the lobe members 38, 40, 48. The first shaft 34 may have an outer diameter (D8) that is less than the second diameter (D2) defined by the second radial inner surface 66 of the lobe member 38 and that is less than the fourth diameter (D4) defined by the second and third radial inner surfaces 84, 86 of the lobe member 40. An annular clearance (C1) may exist radially between an entire circumference of the first shaft 34 and the second radial inner surface 66 of the lobe member 38 and between an entire circumference of the first shaft 34 and the second and third radial inner surfaces 84, 86 of the lobe member 40.

During assembly, the second radial inner surface 66 of the lobe member 38 and the second and third radial inner surfaces 84, 86 of the lobe member 43 may be free from direct contact with the first shaft 34. Therefore, the coupling between the lobe members 38, 42 and the first shaft 34 does not distort the bearing portions 60, 76, 78. For example, a radial outward force may be applied from within the first shaft 34 to deform the first shaft 34 and provide the frictional engagement between the lobe members 38, 42 and the first shaft 34 at the first radial inner surface 64 of the lobe member 38 and at the first radial inner surface 82 of the lobe member 42. Due to the offset between the second radial inner surface 66 of the lobe member 38 and the first shaft 34 and the offset between the second and third radial inner surfaces 84, 86 of the lobe member 40 and the first shaft 34, the portion of the first shaft 34 located within the 60, 76, 78 may be deformed without deforming or distorting the bearing portions 60, 76, 78. The radial outward force may be applied in a variety of ways including ballizing, expanding mandrel, and hydraulic expansion.

The sixth diameter (D6) defined by the third radial inner surface 106 of the lobe member 48 may also be greater than the outer diameter (D8) of the first shaft 34. An annular clearance (C2) may exist radially between an entire circumference of the first shaft 34 and the third radial inner surface 106 of the lobe member 48. Therefore, the surface finish of the first shaft 34 does not affect the bearing support of the lobe member 48. The tolerance for the outer diameter (D8) of the first shaft 34 may also be increased since the first shaft 34 does not provide any direct bearing support for the lobe member 48.

What is claimed is:

1. A camshaft comprising:
   a first shaft;
   a first lobe member fixed to the first shaft and including a first lobe portion and a first bearing portion extending axially from the first lobe portion;
   a second lobe member fixed to the first shaft and including a second lobe portion and a second bearing portion extending axially from the second lobe portion toward the first bearing portion; and
   a third lobe member rotatable relative to the first and second lobe members and including a first end rotatably supported on the first bearing portion and a second end rotatably supported on the second bearing portion.

2. The camshaft of claim 1, wherein the first lobe member includes a bore defining a first radial inner surface at the first lobe portion that abuts the first shaft and is frictionally engaged with the first shaft.

3. The camshaft of claim 2, wherein the bore defines a second radial inner surface at the first bearing portion that is radially offset relative to the first shaft.

4. The camshaft of claim 1, wherein the first lobe member includes a bore defining a first radial inner surface at the first lobe portion and a second radial inner surface at the first bearing portion that is offset radially outwardly relative to the first radial inner surface.

5. The camshaft of claim 1, further comprising a second shaft, the first shaft including a bore therethrough and the second shaft being disposed within the bore for rotation relative to the first shaft, the third lobe member being fixed for rotation with the second shaft.

6. The camshaft of claim 5, wherein the third lobe member includes a third lobe portion and a fixation portion, the third lobe portion being bearingly supported on the first bearing portion and the first fixation portion being fixed for rotation with the second shaft.

7. The camshaft of claim 1, wherein the first end of the third lobe member includes a third lobe portion.

8. The camshaft of claim 7, wherein the second end of the third lobe member includes a fourth lobe portion, the third and fourth lobe portions being connected by a connecting portion that extends axially between the third and fourth lobe portions, the third lobe member including a bore defining a first radial inner surface at the third lobe portion, a second radial inner surface at the fourth lobe portion, and a third radial inner surface at the connecting portion that is disposed radially inwardly relative to the first and second radial inner surfaces.

9. The camshaft of claim 8, wherein a stepped region is formed between the first and third radial inner surfaces, the third radial inner surface being located radially inwardly relative to an outer surface of the first bearing portion.

10. The camshaft of claim 8, wherein an annular clearance is defined between the third radial inner surface of the connecting portion and an outer surface of the first shaft.

11. An engine assembly comprising:
an engine structure;
a camshaft supported on the engine structure and including:
  a first shaft;
  a first lobe member fixed to the first shaft and including a first lobe portion and a first bearing portion extending axially from the first lobe portion;
  a second lobe member fixed to the first shaft and including a second lobe portion and a second bearing portion extending axially from the second lobe portion toward the first bearing portion; and
  a third lobe member including a first end rotatably supported on the first bearing portion and a second end rotatably supported on the second bearing portion; and
a cam phaser coupled to the camshaft that selectively rotates the third lobe member on the first and second bearing portions.

12. The engine assembly of claim 11, wherein the first lobe member includes a bore defining a first radial inner surface at the first lobe portion that abuts the first shaft and is frictionally engaged with the first shaft.

13. The engine assembly of claim 12, wherein the bore defines a second radial inner surface at the first bearing portion that is radially offset relative to the first shaft.

14. The engine assembly of claim 11, wherein the first lobe member includes a bore defining a first radial inner surface at the first lobe portion and a second radial inner surface at the first bearing portion that is offset radially outwardly relative to the first radial inner surface.

15. The engine assembly of claim 11, further comprising a second shaft, the first shaft including a bore therethrough and the second shaft being disposed within the bore for rotation relative to the first shaft, the third lobe member being fixed for rotation with the second shaft.

16. The engine assembly of claim 15, wherein the third lobe member includes a third lobe portion and a fixation portion, the third lobe portion being bearingly supported on the first bearing portion and the first fixation portion being fixed for rotation with the second shaft.

17. The engine assembly of claim 11, wherein the first end of the third lobe member includes a third lobe portion.

18. The engine assembly of claim 17, wherein the second end of the third lobe member includes a fourth lobe portion, the third and fourth lobe portions being connected by a connecting portion that extends axially between the third and fourth lobe portions, the third lobe member including a bore defining a first radial inner surface at the third lobe portion, a second radial inner surface at the fourth lobe portion, and a third radial inner surface at the connecting portion that is disposed radially inwardly relative to the first and second radial inner surfaces.

19. The engine assembly of claim 18, wherein a stepped region is formed between the first and third radial inner surfaces, the third radial inner surface being located radially inwardly relative to an outer surface of the first bearing portion.

20. The engine assembly of claim 18, wherein an annular clearance is defined between the third radial inner surface of the connecting portion and an outer surface of the first shaft.

* * * * *